(12) United States Patent
Sawayashiki et al.

(10) Patent No.: US 11,495,256 B2
(45) Date of Patent: Nov. 8, 2022

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Yoshihiro Sawayashiki, Minami-ashigara (JP); Gen Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/185,106

(22) Filed: Feb. 25, 2021

(65) Prior Publication Data
US 2021/0272594 A1    Sep. 2, 2021

(30) Foreign Application Priority Data

Feb. 28, 2020    (JP) .............................. JP2020-034234

(51) Int. Cl.
| G11B 5/65 | (2006.01) |
| G11B 5/008 | (2006.01) |
| G11B 5/733 | (2006.01) |
| G11B 5/735 | (2006.01) |
| G11B 5/706 | (2006.01) |

(52) U.S. Cl.
CPC .......... *G11B 5/653* (2013.01); *G11B 5/00813* (2013.01); *G11B 5/70678* (2013.01); *G11B 5/733* (2013.01); *G11B 5/7356* (2019.05)

(58) Field of Classification Search
None
See application file for complete search history.

(56) References Cited

U.S. PATENT DOCUMENTS

| 5,718,964 | A | * | 2/1998 | Naoe | ...................... G11B 5/708 |
| | | | | | 428/323 |
| 10,395,684 | B2 | * | 8/2019 | Biskeborn | ............. G11B 5/7369 |
| 2003/0049493 | A1 | * | 3/2003 | Naoe | ...................... G11B 5/708 |
| 2004/0091748 | A1 | * | 5/2004 | Kamata | ................... G11B 5/855 |
| | | | | | 428/848.3 |
| 2004/0191465 | A1 | * | 9/2004 | Murayama | ............... G11B 5/70 |
| | | | | | 428/840.3 |
| 2005/0089721 | A1 | * | 4/2005 | Murayama | ......... G11B 5/73927 |
| 2007/0003797 | A1 | * | 1/2007 | Meguro | ............... G11B 5/7368 |
| | | | | | 428/840.2 |
| 2007/0212576 | A1 | * | 9/2007 | Brodd | .................. G11B 5/7334 |
| | | | | | 427/127 |
| 2008/0182135 | A1 | * | 7/2008 | Murayama | ........... G11B 5/7026 |
| | | | | | 428/840.2 |
| 2009/0162701 | A1 | * | 6/2009 | Jensen | .................... G11B 5/714 |
| | | | | | 428/836.3 |
| 2010/0323222 | A1 | * | 12/2010 | Nakashio | ............... G11B 5/733 |
| | | | | | 428/800 |
| 2021/0249045 | A1 | * | 8/2021 | Yamaga | ................... G11B 5/70 |

FOREIGN PATENT DOCUMENTS

| JP | H06-004854 A | | 1/1994 |
| JP | H11-086270 A | | 3/1999 |
| JP | 2001031779 A | * | 2/2001 |
| JP | 2006323892 A | * | 11/2006 |

OTHER PUBLICATIONS

Abstract of JP 2006-323892 A (Year: 2006).*
Abstract of JP 2001-031779 A (Year: 2001).*

* cited by examiner

*Primary Examiner* — Kevin M Bernatz
(74) *Attorney, Agent, or Firm* — Sughrue Mion, PLLC

(57) ABSTRACT

The magnetic recording medium includes a non-magnetic support, and a magnetic layer including a ferromagnetic powder. The ferromagnetic powder is a ferromagnetic powder selected from the group consisting of a hexagonal strontium ferrite powder and an ε-iron oxide powder. The standard deviation of a height of the magnetic projection portion on a surface of the magnetic layer is in a range of 0.5 to 2.5 nm.

15 Claims, No Drawings

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application claims priority under 35 U.S.C 119 to Japanese Patent Application No. 2020-034234 filed on Feb. 28, 2020. The above application is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

Magnetic recording media have been widely used as recording media for recording various pieces of data (see, for example, JP1994-004854A (JP-H06-004854A) and JP1999-086270A (JP-H11-086270A)).

SUMMARY OF THE INVENTION

It is desired that a magnetic recording medium exhibits excellent electromagnetic conversion characteristics. Meanwhile, in the related art, it was proposed that, regarding a ferromagnetic powder contained in a magnetic layer of the magnetic recording medium, for example, various ferromagnetic powders disclosed in paragraph 0047 of JP1994-004854A (JP-H06-004854A) and paragraph 0038 of JP1999-086270A (JP-H11-086270A) were used. Among them, in recent years, a hexagonal strontium ferrite powder and an $\varepsilon$-iron oxide powder have been attracting attention from a viewpoint of high-density recording suitability and the like. However, according to the study by the inventors, a magnetic recording medium including a ferromagnetic powder selected from the group consisting of a hexagonal strontium ferrite powder and an $\varepsilon$-iron oxide powder in a magnetic layer tends to have deteriorated electromagnetic conversion characteristics.

Therefore, according to an aspect of the invention, an object is to provide a magnetic recording medium including a ferromagnetic powder selected from the group consisting of a hexagonal strontium ferrite powder and an $\varepsilon$-iron oxide powder in a magnetic layer and capable of exhibiting excellent electromagnetic conversion characteristics.

According to one aspect of the invention, there is provided a magnetic recording medium comprising:

a non-magnetic support; and a magnetic layer including a ferromagnetic powder, in which the ferromagnetic powder is a ferromagnetic powder selected from the group consisting of a hexagonal strontium ferrite powder and an $\varepsilon$-iron oxide powder, and a standard deviation of a height of a magnetic projection portion on a surface of the magnetic layer is in a range of 0.5 to 2.5 nm.

In one embodiment, the magnetic recording medium may further include at least one layer of a non-magnetic layer including a non-magnetic powder between the non-magnetic support and the magnetic layer.

In one embodiment, the non-magnetic powder may be a non-magnetic powder selected from the group consisting of a non-magnetic iron oxide powder and a carbon black.

In one embodiment, the magnetic recording medium may include at least one layer of a non-magnetic layer including a carbon black.

In one embodiment, the magnetic recording medium may include two layers of the non-magnetic layer.

In one embodiment, among the two non-magnetic layers, one non-magnetic layer on a magnetic layer side may contain a non-magnetic iron oxide powder, and the other non-magnetic layer on a non-magnetic support side may contain a carbon black.

In one embodiment, the non-magnetic iron oxide powder may be an $\alpha$-iron oxide powder.

In one embodiment, an average particle size of the non-magnetic iron oxide powder may be 50 nm or less.

In one embodiment, an acicular ratio of the non-magnetic iron oxide powder may be 3.0 or less.

In one embodiment, a surface electric resistance value Rs of the surface of the magnetic layer may be less than $1.0 \times 10^{+7}$ $\Omega$/sq.

In one embodiment, a thickness of the non-magnetic layer may be in a range of 0.05 to 1.5 $\mu$m. In a case where a plurality of the non-magnetic layers are provided, the thickness of the non-magnetic layer is a total thickness of the plurality of non-magnetic layers.

In one embodiment, the magnetic recording medium may include a back coating layer including a non-magnetic powder on a surface side of the non-magnetic support opposite to the surface side on which the magnetic layer is provided.

In one embodiment, the magnetic recording medium may be a magnetic tape.

According to another aspect of the invention, there is provided a magnetic tape cartridge comprising the magnetic tape.

According to still another aspect of the invention, there is provided a magnetic recording and reproducing device comprising the magnetic recording medium.

According to one aspect of the invention, it is possible to provide a magnetic recording medium including a ferromagnetic powder selected from the group consisting of a hexagonal strontium ferrite powder and an $\varepsilon$-iron oxide powder in a magnetic layer and capable of exhibiting excellent electromagnetic conversion characteristics. In addition, according to one aspect of the invention, it is possible to provide a magnetic tape cartridge and a magnetic recording and reproducing device including the magnetic recording medium.

DESCRIPTION OF THE PREFERRED EMBODIMENTS

Magnetic Recording Medium

An embodiment of the invention relates to a magnetic recording medium including a non-magnetic support, and a magnetic layer including a ferromagnetic powder. The ferromagnetic powder is a ferromagnetic powder selected from the group consisting of a hexagonal strontium ferrite powder and an $\varepsilon$-iron oxide powder, and is a standard deviation of a height of the magnetic projection portion on a surface of the magnetic layer (hereinafter, also simply referred to as a "standard deviation of a height of a magnetic projection portion") is in a range of 0.5 to 2.5 nm.

Standard Deviation of Height of Magnetic Projection Portion

In the invention and the specification, the "standard deviation of the height of the magnetic projection portion" is a value obtained on the surface of the magnetic layer by the following method. In the invention and the specification, the "surface of the magnetic layer" is identical to the surface of the magnetic recording medium on the magnetic layer side.

(1) A region having an area of 6.0 µm×6.0 µm of a surface of a magnetic layer of a magnetic recording medium to be measured in a tapping mode is imaged by an atomic force microscope (AFM) to obtain an AFM image. In imaging conditions, a scan speed (probe movement speed) is set as 4.5 µm/sec and a resolution is set as 1024 px×1024 px. As the AFM, S-image/Nanonavi manufactured by Seiko Instruments Inc. can be used, and as the probe, SI-DF40 (rear surface Al coat) manufactured by Hitachi High-Tech Science Co., Ltd. can be used. In the examples which will be described later, this AFM and a probe were used.

(2) An SEM image is obtained by a scanning electron microscope (SEM) in the same region as a region where the AFM image is obtained. As the scanning electron microscope, a field emission-scanning electron microscope (FE-SEM) is used. As the FE-SEM, for example, FE-SEM SU8220 manufactured by Hitachi High-Tech Science Co., Ltd. can be used, and this FE-SEM was used in the examples which will be described later. In addition, the surface of the magnetic layer is not coated before imaging the SEM image. The SEM image to be obtained is a backscattered electron image.

Under the imaging conditions, an acceleration voltage is set as 2 kV, a working distance is set as 3 mm, and an imaging magnification is set as 20,000 times. Focus adjustment is performed under the imaging conditions described above, and a backscattered electron image is captured. The magnetic layer normally includes one or more kinds of non-magnetic powders in addition to the ferromagnetic powder. A projection portion formed of the non-magnetic powder is referred to as a "non-magnetic projection portion". The non-magnetic projection portion is specified in the imaged backscattered electron image. The non-magnetic projection portion can be specified by, for example, incorporating a backscattered electron image from which a portion displaying a size and the like (scale bar, cross mark, and the like) is removed from the captured image into image processing software and performing binarization process. As the image analysis software, for example, free software ImageJ can be used. By the binarization process, the image is divided into a bright area (white portion) and a dark area (black portion).

The non-magnetic projection portion can be specified, for example, as follows.

In the backscattered electron image captured under the above imaging conditions, a binarization process for displaying a projection formed of a non-magnetic powder usually included in the magnetic layer in order to apply abrasive properties to the surface of the magnetic layer (hereinafter, also referred to as "abrasive") as a bright area (that is, a white portion) is executed. For example, a lower limit value is 210 gradations and an upper limit value is 255 gradations, and the binarization process is executed by these two threshold values. Before binarization process, noise component removal process is performed by the image analysis software. The noise component removal process can be performed by the following method, for example. In the image analysis software ImageJ, a blurring process Gauss Filter is selected to remove the noise component.

A portion displayed as a bright area (that is, white portion) in the binarized image is specified as a "non-magnetic projection portion".

In addition to the binarization process described above, in the backscattered electron image captured under the above imaging conditions, a binarization process for displaying a projection formed of a non-magnetic powder usually included in the magnetic layer in order to form a suitable projection on the surface of the magnetic layer for controlling friction properties (hereinafter, also referred to as "projection formation agent") as a dark area (that is, a black portion) is executed. For example, a lower limit value is 0 gradations and an upper limit value is 75 gradations, and the binarization process is executed by these two threshold values. Before binarization process, noise component removal process is performed by the image analysis software. The noise component removal process can be performed by the following method, for example. In the image analysis software ImageJ, a blurring process Gauss Filter is selected to remove the noise component.

A portion displayed as a dark area (that is, black portion) in the binarized image is also specified as a "non-magnetic projection portion".

Alternatively, the non-magnetic projection portion can also be specified by using component analysis by SEM (for example, obtaining of a component map), or a well-known method such as energy dispersive X-ray spectrometry (EDS) or auger electron spectroscopy (AES) in combination. For example, in the backscattered electron image captured under the above imaging conditions, a portion identified as a projection portion formed of the non-magnetic powder by component analysis can be specified by using a freehand tool of image analysis software. Such specification can be performed by, for example, a freehand Region of Interest (ROI) tool of the image analysis software ImageJ.

Alternatively, even in a case where there is a projection portion formed of a type of non-magnetic powder (for example, a projection formation agent) that is not displayed as a bright area or a dark area in the binarization process described above, the projection portion can be similarly specified.

(3) From height data of the AFM image obtained in the above section (1), height data of the projection portion at the position specified as the non-magnetic projection portion in the SEM image in the above section (2) is excluded. The projection portion in the height data of the remaining projection portion is defined as a "magnetic projection portion". A standard deviation of the height of these magnetic projection portions (that is, the positive square root of the dispersion) is defined as a "standard deviation of the height of the magnetic projection portion".

The measurement and the analysis described above are performed for three different measurement regions on the surface of the magnetic layer (n=3). An arithmetic mean of the standard deviation of the height of the magnetic projection portion thus obtained is used as a value of the standard deviation of the height of the magnetic projection portion on the surface of the magnetic layer of the magnetic recording medium to be measured.

In the magnetic recording medium, the standard deviation of the height of the magnetic projection portion obtained by the method described above on the surface of the magnetic layer is in a range of 0.5 to 2.5 nm. The standard deviation of the height of the magnetic projection portion in the range described above can contribute to excellent electromagnetic conversion characteristics exhibited by the magnetic recording medium including a ferromagnetic powder selected from the group consisting of a hexagonal strontium ferrite powder and an ε-iron oxide powder in a magnetic layer. In this regard, the inventors surmise as follows. However, the invention is not limited to other surmises described in this specification.

A magnetic recording medium including a magnetic layer including a ferromagnetic powder selected from the group consisting of hexagonal strontium ferrite powder and ε-iron oxide powder generally has a higher anisotropic magnetic field Hk, compared to a magnetic recording medium including a ferromagnetic powder used in the magnetic layer in the related art. It is considered that this is a reason that the electromagnetic conversion characteristics are easily deteriorated in the magnetic recording medium including the magnetic layer including a ferromagnetic powder selected from the group consisting of a hexagonal strontium ferrite powder and an ε-iron oxide powder. Specifically, it is surmised that, a magnetic recording medium having a high Hk is easily affected by spacing fluctuations, and ferromagnetic particles in a deep portion of the magnetic layer tend to be hard to be reversely magnetized (hard to be recorded) by the magnetic field of the recording head, and accordingly, the electromagnetic conversion characteristics are easily deteriorated.

On the other hand, the magnetic recording medium includes a magnetic layer including a ferromagnetic powder selected from the group consisting of hexagonal strontium ferrite powder and ε-iron oxide powder, and the standard deviation of the height of the magnetic projection portion on the surface of the magnetic layer is in a range of 0.5 to 2.5 nm. The inventors have considered that the magnetic projection portion is a portion specified by the method described above and can be defined as a projection portion substantially formed of the ferromagnetic powder. The inventors have surmised that, the standard deviation of the height of the magnetic projection portion of 2.5 nm or less implies that a fluctuation in surface shape of the portion of the surface of the magnetic layer formed of substantially ferromagnetic powder is small, that is, the spacing fluctuation is small. It is considered that this contributes to the improvement of the electromagnetic conversion characteristics of the magnetic recording medium including the magnetic layer including a ferromagnetic powder selected from the group consisting of a hexagonal strontium ferrite powder and an ε-iron oxide powder. In addition, the inventors have surmised that the fact that portion of the surface of the magnetic layer having the magnetic projection portion has an appropriate roughness (appropriate height fluctuation) contributes to reduction of a friction coefficient while the surface of the magnetic layer and the magnetic head come into contact with each other and slide thereby enabling smooth sliding between the surface of the magnetic layer and the magnetic head. The smooth sliding leads to noise reduction, which is also considered to contribute to the improvement of electromagnetic conversion characteristics.

The standard deviation of the height of the magnetic projection portion is 2.5 nm or less, preferably 2.3 nm or less, and more preferably 2.0 nm or less, from a viewpoint of improving the electromagnetic conversion characteristics. In addition, from viewpoints of reducing the friction coefficient between the surface of the magnetic layer and the magnetic head and improving the electromagnetic conversion characteristics, the standard deviation of the height of the magnetic projection portion is 0.5 nm or more, preferably 0.7 nm or more, and more preferably 1.0 nm or more.

The method for controlling the standard deviation of the height of the magnetic projection portion will be described later.

Hereinafter, the magnetic recording medium will be further described in detail.

Magnetic Layer

Ferromagnetic Powder

The magnetic recording medium includes a magnetic layer including a ferromagnetic powder selected from the group consisting of a hexagonal strontium ferrite powder and an ε-iron oxide powder. The magnetic layer can include one kind alone or two or more kinds of ferromagnetic powder selected from the group consisting of a hexagonal strontium ferrite powder and an ε-iron oxide powder.

Regard the particle size of the ferromagnetic powder, an average particle volume which is an index of particle sizes is preferably 2,500 $nm^3$ or less, more preferably 2,300 $nm^3$ or less, even more preferably 2,000 $nm^3$ or less, still more preferably 1,500 $nm^3$ or less, from a viewpoint of improving recording density. From a viewpoint of magnetization stability, the average particle volume of the ferromagnetic powder is preferably 500 $nm^3$ or more, more preferably 600 $nm^3$ or more, even more preferably 650 $nm^3$ or more, and still preferably 700 $nm^3$ or more. The average particle volume described above is a value obtained as a sphere-equivalent volume from the average particle size obtained by the method which will be described later.

Hexagonal Strontium Ferrite Powder

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder means that a divalent metal atom mainly included in this powder is a strontium atom. The hexagonal barium ferrite powder means that the main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

The anisotropy constant Ku can be used as an index of reduction of thermal fluctuation, that is, improvement of thermal stability. The hexagonal strontium ferrite powder can preferably have Ku equal to or greater than $1.8 \times 10^5$ J/m$^3$, and more preferably have Ku equal to or greater than $2.0 \times 10^5$ J/m$^3$. In addition, Ku of the hexagonal strontium ferrite powder can be, for example, equal to or smaller than $2.5 \times 10^5$ J/m$^3$. However, the high Ku is preferable, because it means high thermal stability, and thus, Ku is not limited to the exemplified value. A unit of the anisotropy constant Ku is 1 erg/cc=$1.0 \times 10^{-1}$ J/m$^3$.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. In contrast, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably 0.5 to 5.0 atom % with respect to 100 atom % of the iron atom. It is thought that the hexagonal strontium ferrite powder including the rare earth atom having the bulk content in the range described above and uneven distribution of the rare earth atom in the surface layer portion of the particles configuring the hexagonal strontium ferrite powder contribute to the prevention of reduction of reproduction output during the repeated reproduction. It is surmised that this is because the anisotropy constant Ku can be increased due to the hexagonal strontium ferrite powder including the rare earth atom having the bulk content in the range described above and uneven distribution of the rare earth atom in the surface layer portion of the particles configuring the hexagonal strontium ferrite powder. As the value of the anisotropy constant Ku is high, occurrence of a phenomenon, so-called thermal fluctuation can be prevented (that is, thermal stability can be improved). By preventing the occurrence of thermal fluctuation, it is possible to prevent reduction of the reproduction output during the repeated reproduction. It is surmised that, the uneven distribution of the rare earth atom in the particle surface layer portion of the hexagonal strontium ferrite powder contributes to stabilization of a spin at an iron (Fe) site in a crystal lattice of the surface layer portion, thereby increasing the anisotropy constant Ku.

It is surmised that the use of the hexagonal strontium ferrite powder having the rare earth atom surface layer portion uneven distribution as the ferromagnetic powder of the magnetic layer contributes to the prevention of chipping of the surface of the magnetic layer due to the sliding with the magnetic head. That is, it is surmised that the hexagonal strontium ferrite powder having the rare earth atom surface layer portion uneven distribution also contributes to the improvement of running durability of the magnetic recording medium. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atoms are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atom is unevenly distributed in the surface layer portion (that is, a larger amount of the rare earth atoms is present, compared to that inside), among the particles configuring the hexagonal strontium ferrite powder. In addition, the ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as a powder, sample powder for the partial dissolving and the total dissolving are collected from the powder of the same lot. Meanwhile, regarding the hexagonal strontium ferrite powder included in a magnetic layer of a magnetic recording medium, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-091747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70 □C for 1 hour. The obtained solution is filtered with a membrane filter having a hole diameter of 0.1 μm. The element analysis of the filtrate obtained as described above is performed by an inductively coupled plasma (ICP) analysis device. By doing so, the rare earth atom surface layer portion content with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80□C for 3 hours. After that, the process is performed in the same manner as in the partial dissolving and the measurement of the surface layer portion content, and the bulk content with respect to 100 atom % of the iron atom can be obtained.

From a viewpoint of increasing reproduction output in a case of reproducing data recorded on a magnetic recording medium, it is desirable that the mass magnetization σs of ferromagnetic powder included in the magnetic recording medium is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that the hexagonal strontium ferrite powder having the rare earth atom surface layer portion uneven distribution is preferable for preventing such a significant decrease in σs. In one embodiment, σs of the hexagonal strontium ferrite powder can be equal to or greater than 45 A·m$^2$/kg and can also be equal to or greater than 47 A·m$^2$/kg. On the other hand, from a viewpoint of noise reduction, σs is preferably equal to or smaller than 80 A·m$^2$/kg and more preferably equal to or smaller than 60 A·m$^2$/kg. σs can be measured by using a well-known measurement device capable of measuring magnetic properties such as a vibrating sample magnetometer. In the invention and the specification, the mass magnetization σs is a value measured at a magnetic field strength of 15 kOe, unless otherwise noted. 1 [kOe]=(10$^6$/4π) [A/m]

Regarding the content (bulk content) of the constituting atom in the hexagonal strontium ferrite powder, a content of the strontium atom can be, for example, 2.0 to 15.0 atom % with respect to 100 atom % of the iron atom. In one embodiment, in the hexagonal strontium ferrite powder, the divalent metal atom included in this powder can be only a strontium atom. In another embodiment, the hexagonal strontium ferrite powder can also include one or more kinds of other divalent metal atoms, in addition to the strontium atom. For example, a barium atom and/or a calcium atom can be included. In a case where the other divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one embodiment, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can further include a rare earth atom. In addition, the hexagonal strontium ferrite powder may or may not include atoms other than these atoms. As an example the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one embodiment, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one embodiment, the hexagonal strontium ferrite powder does not include a bismuth atom (Bi).

In a case where the magnetic recording medium includes the hexagonal strontium ferrite powder in the magnetic layer, the anisotropic magnetic field Hk of the magnetic recording medium is preferably 14 kOe or more, more preferably 16 kOe or more, and even more preferably 18 kOe or more. In addition, the anisotropic magnetic field Hk is preferably 90 kOe or less, more preferably 80 kOe or less, and even more preferably 70 kOe or less.

The anisotropic magnetic field Hk in the invention and the specification refers to a magnetic field in which magnetization is saturated, in a case where a magnetic field is applied in a direction of the magnetization hard axis of the magnetic layer. The anisotropic magnetic field Hk can be measured by using a well-known measurement device capable of measuring magnetic properties such as a vibrating sample magnetometer. A sample piece that can be introduced into the measurement device is cut out from the magnetic recording medium to be measured, and the Hk is measured for the sample piece at a temperature of 23° C. By setting the ambient temperature around the sample piece to 23° C., the temperature of the sample piece can be set to 23° C. by realizing temperature equilibrium. In the magnetic layer including the hexagonal strontium ferrite powder, the direction of the magnetization hard axis of the magnetic layer is an in-plane direction.

ε-Iron Oxide Powder

In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a producing method of the ε-iron oxide powder, a producing method from a goethite, and a reverse micelle method are known. All of the producing methods are well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. 51, pp. S280-S284, J. Mater. Chem. C, 2013, 1, pp. 5200-5206 can be referred to, for example. However, the producing method of the ε-iron oxide powder which can be used as the ferromagnetic powder in the magnetic layer of the magnetic recording medium is not limited to the methods described here.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproduction output in a case of reproducing data recorded on a magnetic recording medium, it is desirable that the mass magnetization σs of ferromagnetic powder included in the magnetic recording medium is high. In regard to this point, in one embodiment, σs of the ε-iron oxide powder can be equal to or greater than 8 A·m$^2$/kg and can also be equal to or greater than 12 A·m$^2$/kg. On the other hand, from a viewpoint of noise reduction, σs of the ε-iron oxide powder is preferably equal to or smaller than 40 A·m$^2$/kg and more preferably equal to or smaller than 35 A·m$^2$/kg.

In a case where the magnetic recording medium includes the ε-iron oxide powder in the magnetic layer, the anisotropic magnetic field Hk of the magnetic recording medium is preferably 18 kOe or more, more preferably 30 kOe or more, and even more preferably 38 kOe or more. In addition, the anisotropic magnetic field Hk is preferably 100 kOe or less, more preferably 90 kOe or less, and even more preferably 75 kOe or less. In the magnetic layer including the ε-iron oxide powder, the direction of the magnetization hard axis of the magnetic layer is an in-plane direction.

In the invention and the specification, average particle sizes of various powders are values measured by the following method with a transmission electron microscope, unless otherwise noted.

The powder is imaged at an imaging magnification ratio of 100,000 with a transmission electron microscope, the image is printed on photographic printing paper or displayed on a display so that the total magnification ratio of 500,000 to obtain an image of particles configuring the powder. The powder included in the magnetic layer of the magnetic recording medium can be imaged using a cutting piece produced by the following method, and an image of the particles described above can be obtained. A magnetic recording medium adheres to a resin block or the like, a cutting piece is produced using a microtome or the like, and the produced cutting piece is observed with a transmission electron microscope to specify and image the magnetic layer portion. For example, for a tape-shaped magnetic recording medium (that is, a magnetic tape), the magnetic tape can be cut in a longitudinal direction to produce a cutting piece.

A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic mean of the particle size of 500 particles obtained as described above is an average particle size of the powder. As the transmission electron microscope, a transmission electron microscope H-9000 manufactured by Hitachi high-tech corporation can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi high-tech corporation as the transmission electron microscope, and image analysis software KS-400 manufactured by Carl Zeiss as the image analysis software, and the average particle volume of the ferromagnetic powder is a value calculated as a sphere-equivalent volume from the average particle size thus obtained. In the invention and the specification, the powder means an aggregate of a plurality of particles. For example, the ferromagnetic powder means an aggregate of a plurality of ferromagnetic particles. The aggregate of a plurality of particles is not limited to an embodiment in which particles configuring the aggregate directly come into contact with each other, but also includes an embodiment in which a binding agent, an additive, or the like which will be described later is interposed between the particles. A term, particles may be used for representing the powder.

As a method of collecting a sample powder from the magnetic recording medium in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, a length of a short axis, that is, a short axis length of the particles is measured in the measurement described above, and an acicular ratio of the powder is obtained as a value of "average long axis length/average short axis length" from an arithmetic mean (average long axis length) of the long axis lengths obtained regarding the 500 particles and an arithmetic mean (average short axis length) of short axis lengths. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (average long axis length/average short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

Binding Agent

The magnetic recording medium can be a coating type magnetic recording medium, and can include a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the non-magnetic layer and/or a back coating layer which will be described later.

For the binding agent described above, description disclosed in paragraphs 0028 to 0031 of JP2010-024113A can be referred to. The content of the binding agent of the magnetic layer can be, for example, 1.0 to 30.0 parts by mass with respect to 100.0 parts by mass of the ferromagnetic powder. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

Curing Agent

A curing agent can also be used together with the resin which can be used as the binding agent. As the curing agent, in one embodiment, a thermosetting compound which is a compound in which a curing reaction (crosslinking reaction) proceeds due to heating can be used, and in another embodiment, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The content of the curing agent in the magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Additives

The magnetic layer may include one or more kinds of additives, as necessary. As the additives, the curing agent described above is used as an example. In addition, examples of the additive included in the magnetic layer include a non-magnetic powder (for example, inorganic powder, carbon black, and the like), a lubricant, a dispersing agent, a dispersing assistant, a fungicide, an antistatic agent, and an antioxidant. In addition, for example, for the lubricant, a description disclosed in paragraphs 0030 to 0033, 0035, and 0036 of JP2016-126817A can be referred to. The non-magnetic layer which will be described later may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in a paragraph 0061 of JP2012-133837A can be referred to.

Examples of the non-magnetic powder included in the magnetic layer include non-magnetic powder that can function as an abrasive. The abrasive is preferably a non-magnetic powder having Mohs hardness exceeding 8 and more preferably a non-magnetic powder having Mohs hardness equal to or greater than 9. A maximum value of Mohs hardness is 10 of diamond. The abrasive can be a powder of an inorganic substance and can also be a powder of an organic substance. The abrasive can be a powder of an inorganic or organic oxide or a powder of a carbide. Examples of the carbide include a boron carbide (for example, $B_4C$), a titanium carbide (for example, TiC), and the like. In addition, diamond can also be used as the abrasive. Examples of the powder of the inorganic oxide include powder of alumina (for example, $Al_2O_3$), a titanium oxide (for example, $TiO_2$), a cerium oxide (for example, $CeO_2$), a zirconium oxide (for example, $ZrO_2$), and the like. The Mohs hardness of alumina is approximately 9. For details of the alumina powder, description disclosed in paragraph 0021 of JP2013-229090A can also be referred to. In addition, a content of the abrasive in the magnetic layer is preferably 1.0 to 20.0 parts by mass and more preferably 1.0 to 15.0 parts by mass with respect to 100.0 parts by mass of the ferromagnetic powder. As the abrasive, only one kind of non-magnetic powder can be used or two or more kinds of non-magnetic powders having different compositions and/or physical properties (for example, size) can also be used. An average particle size of the abrasive is, for example, in a range of 30 to 300 nm and preferably in a range of 50 to 200 nm.

As the non-magnetic powder that can be included in the magnetic layer, a non-magnetic powder (for example, carbon black, non-magnetic colloidal particles, or the like) that can function as a projection formation agent which forms projections appropriately protruded from the surface of the magnetic layer. As the carbon black, for example, carbon black having an average particle size of 5 to 300 nm can be used. A content of the carbon black in the magnetic layer can be, for example, 0.1 to 30.0 parts by mass with respect to 100.0 parts by mass of the ferromagnetic powder.

As the various additives, commercially available products can be appropriately selected according to desired properties, or the additive can be produced by a well-known method and used in any amount. In addition, as an example of the additive which can be used in the magnetic layer including the abrasive for improving dispersibility of the abrasive, a dispersing agent disclosed in paragraphs 0012 to 0022 of JP2013-131285A can be used.

Surface Electric Resistance Value Rs on the Surface of Magnetic Layer

A magnetic recording medium having a low surface electric resistance value Rs of the surface of the magnetic layer can suppress charging. By suppressing charging, it is possible to prevent foreign materials such as dust, which may cause dropout, from being attached to the surface of the magnetic layer due to charging. From a viewpoint of suppressing the charging, the surface electric resistance value Rs (sheet resistivity) of the surface of the magnetic layer is preferably less than $1.0 \times 10^{+7}$ Ω/sq. In addition, the surface electric resistance value Rs of the surface of the magnetic layer can be, for example, $1.0 \times 10^{+4}$ Ω/sq or more. However, since it is preferable that the surface electric resistance value Rs is low from a viewpoint of suppressing the charging, it may be less than $1.0 \times 10^{+4}$ Ω/sq. In the invention and the specification, the "surface electric resistance value Rs" is a value measured at an applied voltage of 50 V, and can be measured by a well-known method. For example, since carbon black can exhibit a function of imparting conductivity to a magnetic recording medium, by incorporating carbon black in a non-magnetic layer positioned on a lower layer of the magnetic layer, the surface electric resistance value Rs of the surface of the magnetic layer can be decreased. Regarding the unit of Rs, "Ω/sq" means "ohms per square".

The magnetic layer described above can be provided on the surface of the non-magnetic support directly or indirectly through the non-magnetic layer.

Non-Magnetic Layer

Next, the non-magnetic layer will be described. The magnetic recording medium may include a magnetic layer directly on a surface of the non-magnetic support or may include a magnetic layer on the surface of the non-magnetic support with one or a plurality of non-magnetic layers including a non-magnetic powder interposed therebetween.

In order to decrease the value of the standard deviation of the height of the magnetic projection portion, it is preferable to increase surface smoothness of the non-magnetic layer which is a surface on which the magnetic layer is to be formed. From this viewpoint, it is preferable to use a non-magnetic powder having a small average particle size as the non-magnetic powder included in the non-magnetic layer. An average particle size of the non-magnetic powder is preferably in a range of 500 nm or less, more preferably 200 nm or less, even more preferably 100 nm or less, and still preferably 50 nm or less. In addition, from the viewpoint of ease of improving dispersibility of the non-magnetic powder, the average particle size of the non-magnetic powder is preferably 5 nm or more, more preferably 7 nm or more, and even more preferably 10 nm or more.

The non-magnetic powder used in the non-magnetic layer may be an inorganic powder or an organic powder. In addition, carbon black and the like can be used.

For carbon black capable of being used in the non-magnetic layer, for example, a description disclosed in paragraphs 0040 and 0041 of JP2010-024113A can be referred to. As described above, by providing the non-magnetic layer including carbon black, the surface electric resistance value Rs of the surface of the magnetic layer of the magnetic recording medium can be decreased. It is preferable that the surface electric resistance value Rs of the surface of the magnetic layer is low, from the viewpoint of suppressing the charging. From this viewpoint, it is preferable to provide the non-magnetic layer including carbon black. Meanwhile, carbon black generally tends to have a large particle size distribution and tends to have poor dispersibility. Accordingly, the non-magnetic layer including carbon black tends to have low surface smoothness. From this viewpoint, in one embodiment, it is preferable to provide a non-magnetic layer including a non-magnetic powder other than the carbon black, as the non-magnetic layer adjacent to the magnetic layer. In addition, it is preferable to provide a plurality of non-magnetic layers and to set the non-magnetic layer positioned closest to the magnetic layer as a non-magnetic layer including a non-magnetic powder other than the carbon black. For example, it is preferable that two non-magnetic layers are provided between the non-magnetic support and the magnetic layer, the non-magnetic layer on the non-magnetic support side (also referred to as a "lower non-magnetic layer") is set as a non-magnetic layer including carbon black, and the non-magnetic layer on the magnetic layer side is set as a non-magnetic layer including the non-magnetic powder other than carbon black. In addition, in the non-magnetic layer forming composition including a plurality of types of non-magnetic powder, the dispersibility of the non-magnetic powder tends to be easily deteriorated, compared to that in the non-magnetic layer forming composition including one type of non-magnetic powder. From this viewpoint, it is preferable to provide a plurality of non-magnetic layers and reduce the types of non-magnetic powder included in each non-magnetic layer. In addition, in one embodiment, it is preferable to use a dispersing agent, in order to increase the dispersibility of the non-magnetic powder in the non-magnetic layer forming composition including a plurality of types of non-magnetic powder. Such a dispersing agent will be described later.

Examples of the inorganic powder include powders of metal, metal oxide, metal carbonate, metal sulfate, metal nitride, metal carbide, and metal sulfide. These non-magnetic powder can be purchased as a commercially available product or can be produced by a well-known method. For details thereof, descriptions disclosed in paragraphs 0146 to 0150 of JP2011-216149A can be referred to.

As an embodiment of the non-magnetic powder, a non-magnetic iron oxide powder can be used. It is preferable to use a powder having a small particle size as the non-magnetic iron oxide powder, from a viewpoint of decreasing a value of the standard deviation of the height of the magnetic projection portion by increasing the surface smoothness of the non-magnetic layer on which the magnetic layer is to be formed. From this viewpoint, it is preferable to use a non-magnetic iron oxide powder having an average particle size in the range described above, and it is more preferable to use a non-magnetic iron oxide powder having an average particle size of 50 nm or less. In a case where the non-magnetic iron oxide powder has a particle shape of (1) described above, the average particle size is the average long axis length. The acicular ratio (average long axis length/average short axis length) of the non-magnetic iron oxide powder can be more than 1.0. It is preferable to use a powder having a small acicular ratio value as the non-magnetic iron oxide powder, from a viewpoint of improving the surface smoothness of the non-magnetic layer. From this viewpoint, the acicular ratio (average long axis length/average short axis length) of the non-magnetic iron oxide powder is preferably 3.0 or less and more preferably 1.5 or less. As the non-magnetic iron oxide powder, in one embodiment, α-iron oxide powder is preferable. The α-iron oxide is iron oxide is an iron oxide having an α phase as a main phase.

The content (filling percentage) of the non-magnetic powder of the non-magnetic layer is preferably 50% to 90% by mass and more preferably 60% to 90% by mass. In a case where a plurality of non-magnetic layers are provided, a content of the non-magnetic powder in at least one non-magnetic layer is preferably in the range described above, and the content of the non-magnetic powder in more non-magnetic layers is more preferably in the range described above.

The non-magnetic layer can also include a binding agent together with the non-magnetic powder. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

As the additive that can be included in the non-magnetic layer, a dispersing agent that can contribute to improving the dispersibility of the non-magnetic powder can be used. Examples of such dispersing agent include a fatty acid represented by RCOOH (R is an alkyl group or an alkenyl group) (for example, a caprylic acid, a capric acid, a lauric acid, a myristic acid, a palmitic acid, a stearic acid, a behenic acid, an oleic acid, an elaidic acid, a linoleic acid, a linolenic acid, and the like); alkali metal salt or alkaline earth metal salt of the fatty acid; ester of the fatty acid; a compound containing fluorine of ester of the fatty acid; amide of the fatty acid; polyalkylene oxide alkyl phosphates ester; lecithin; trialkyl polyolefin oxyquaternary ammonium salt (alkyl group contained is an alkyl group having 1 to 5 carbon atoms, olefin contained is ethylene, propylene, or the like); phenylphosphonic acid; and copper phthalocyanine. These may be used alone or in combination of two or more kinds thereof. A content of the dispersing agent is preferably 0.2 to 5.0 parts by mass with respect to 100.0 parts by mass of the non-magnetic powder.

In addition, as an example of an additive, an organic tertiary amine can be used. For the organic tertiary amine, a description disclosed in paragraphs 0011 to 0018 and 0021 of JP2013-049832A can be referred to. Organic tertiary amines can contribute to improvement of dispersibility of carbon black. For the formulation of a composition for increasing the dispersibility of carbon black with an organic tertiary amine, paragraphs 0022 to 0024 and 0027 of JP2013-049832A can be referred to.

The amine is more preferably a trialkylamine. The alkyl group contained in the trialkylamine is preferably an alkyl group having 1 to 18 carbon atoms. The three alkyl groups contained in the trialkylamine may be the same or different. For details of the alkyl group, a description disclosed in paragraphs 0015 and 0016 of JP2013-049832A can be referred to. As the trialkylamine, trioctylamine is particularly preferable.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 100 Oe, or a layer having a residual magnetic flux density equal to or smaller than 10 mT and coercivity equal to or smaller than 100 Oe. It is preferable that the non-magnetic layer does not have a residual magnetic flux density and coercivity.

Back Coating Layer

The magnetic recording medium can also include a back coating layer including a non-magnetic powder on a surface of the non-magnetic support opposite to the surface provided with the magnetic layer. The back coating layer preferably includes any one or both of carbon black and inorganic powder. For example, as the non-magnetic powder of the back coating layer, one or both of carbon black having an average particle size of 15 to 50 nm and carbon black having an average particle size of 75 to 500 nm can be used. A carbon black content in the back coating layer is preferably in a range of 50.0 to 200.0 parts by mass and more preferably in a range of 75.0 to 150.0 parts by mass, with respect to 100.0 parts by mass of the binding agent.

In one embodiment, the back coating layer can include one or more kinds of inorganic powders together with a carbon black. A mixing ratio of the inorganic powder to the carbon black is preferably 9:1 to 7:3 as the inorganic powder:carbon black (based on mass). Examples of the inorganic powder include an inorganic powder having an average particle size of 80 to 250 nm and a Mohs hardness of 5 to 9. Examples of the inorganic powder include a non-magnetic powder generally used for the non-magnetic layer and a non-magnetic powder generally used as an abrasive for the magnetic layer, and among them, α-iron oxide, α-alumina, and the like are preferable. A content of the inorganic powder in the back coating layer is preferably in a range of 300.0 to 700.0 parts by mass and more preferably in a range of 400.0 to 500.0 parts by mass with respect to 100.0 parts by mass of the binding agent.

The back coating layer may include a non-magnetic powder, can include a binding agent, and can also include one or more kinds of additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Various Thicknesses

A thickness of the non-magnetic support is, for example, 3.0 to 50.0 μm, preferably 3.0 to 10.0 μm, and more preferably 3.0 to 5.0 μm.

A thickness of the magnetic layer can be optimized according to a saturation magnetization amount of a magnetic head used, a head gap length, a recording signal band, and the like, and is generally 10 to 150 nm, preferably 20 to 120 nm, and more preferably 30 to 100 nm, from a viewpoint of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers. This point also applies to the thickness of the non-magnetic layer in the magnetic recording medium including the plurality of non-magnetic layers.

Regarding the thickness of the non-magnetic layer, as a thicker non-magnetic layer is formed, a presence state of the particles of the non-magnetic powder easily becomes non-uniform in the coating step and the drying step of the non-magnetic layer forming composition, and the difference in thickness at each position tends to increase thereby roughening the surface of the non-magnetic layer. A thickness of the non-magnetic layer is preferably 1.5 μm or less and more preferably 1.0 μm or less, from a viewpoint of improving the surface smoothness of the non-magnetic layer. In addition, the thickness of the non-magnetic layer is preferably 0.05 μm or more and more preferably 0.1 μm or more, from a viewpoint of improving the uniformity of coating of the non-magnetic layer forming composition.

A thickness of the back coating layer is preferably equal to or smaller than 0.9 μm and even more preferably 0.1 to 0.7 μm.

The thicknesses of various layers and the non-magnetic support of the magnetic recording medium can be obtained by a well-known film thickness measurement method. As an example, a cross section of the magnetic recording medium in a thickness direction is exposed by a well-known method of ion beams or microtome, and the exposed cross section is observed with a scanning electron microscope. In the cross section observation, various thicknesses can be obtained as the thickness obtained at one portion, or as an arithmetic mean of thicknesses obtained at a plurality of portions which are two or more portions randomly extracted, for example, two portions. Alternatively, the thickness of each layer may be obtained as a designed thickness calculated under the manufacturing conditions.

Manufacturing Step

Composition for forming the magnetic layer, the non-magnetic layer, and the back coating layer generally includes a solvent, together with the various components described above. As the solvent, various organic solvents generally used for manufacturing a coating type magnetic recording medium can be used. The amount of solvent in each layer forming composition is not particularly limited, and can be identical to that in each layer forming composition of a typical coating type magnetic recording medium. A step of preparing each layer forming composition can generally include at least a kneading step, a dispersing step, and a mixing step provided before and after these steps, as necessary. Each step may be divided into two or more stages. Various components used in the preparation of each layer forming composition may be added at the beginning or during any step. In addition, each component may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (beads diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed, for example, by directly applying the magnetic layer forming composition onto the non-magnetic support or performing multilayer coating of the magnetic layer forming composition with the non-magnetic layer forming composition sequentially or at the same time. The plurality of non-magnetic layers can be formed by sequentially applying the plurality of non-magnetic layer forming compositions or by simultaneously applying multiple layers. It is preferable that the magnetic layer forming composition and the non-magnetic layer forming composition are sequentially applied, that is, the non-magnetic layer forming composition is dried to form the non-magnetic layer, and the magnetic layer forming composition is applied onto the non-magnetic layer, in order to decrease the value of the standard deviation of the height of the magnetic projection portion. This is because that, in the simultaneous multilayer coating, mixing occurs at an interface between the non-magnetic layer and the magnetic layer in a wet state, and the surface of the magnetic layer tends to be rough. For the same reason, in order to increase the surface smoothness of the non-magnetic layer on which the magnetic layer is to be formed, it is preferable to sequentially apply the plurality of non-magnetic layer forming compositions.

The back coating layer can be formed by applying a back coating layer forming composition onto a side of the non-magnetic support opposite to the side provided with the magnetic layer (or to be provided with the magnetic layer).

For details of the coating for forming each layer, a description disclosed in a paragraph 0051 of JP2010-024113A can be referred to.

After the coating step, various processes such as a drying process, an alignment process of a magnetic layer, and a surface smoothing process (calendar process) can be performed. For details of the various steps, a well-known technology disclosed in paragraphs 0052 to 0057 of JP2010-024113A can be referred to, for example. For example, the coating layer of the magnetic layer forming composition can be subjected to an alignment process, while the coating layer is wet. For the alignment process, various well-known technologies such as descriptions disclosed in a paragraph 0067 of JP2010-231843A can be used. For example, a homeotropic alignment process can be performed by a well-known method such as a method using a different polar opposing magnet. In the alignment zone, a coating layer of the magnetic layer forming composition can be controlled by a drying speed of the coating layer a temperature of warm air, an air flow, and/or a transportation speed of the non-magnetic support (the magnetic layer forming composition is applied thereon to form a coating layer) in the alignment zone. In addition, the coating layer may be preliminarily dried before transporting to the alignment zone. Further, regarding the calendar process, in a case where the calendar condition is strengthened, the value of the standard deviation of the height of the magnetic projection portion tends to decrease. The calendar conditions include a calendar pressure, a calendar temperature (surface temperature of the calendar roll), a calendar speed, the hardness of the calendar roll, and the like, as values of the calendar pressure, the calendar temperature, and the hardness of the calendar roll are increased, the calendar process is reinforced, and as the calendar speed is low, the calendar process is reinforced. For example, the calendar pressure (linear pressure) can be 200 to 500 kN/m and is preferably 250 to 350 kN/m. The calendar temperature (surface temperature of the calendar roll) can be, for example, 70 to 120° C., is preferably 80 to 100° C., and the calendar speed can be, for example, 50 to 300 m/min and is preferably 50 to 200 m/min.

The magnetic recording medium according to an embodiment of the invention can be a tape-shaped magnetic recording medium (magnetic tape), and may be a disk-shaped magnetic recording medium (magnetic disc). For example, the magnetic tape is normally accommodated in a magnetic tape cartridge and the magnetic tape cartridge is mounted on a magnetic recording and reproducing device. A servo pattern can be formed on the magnetic recording medium by a well-known method, in order to perform head tracking in the magnetic recording and reproducing device. The "formation of the servo pattern" can be "recording of a servo signal". Hereinafter, the formation of the servo pattern will be described using a magnetic tape as an example.

The servo pattern is generally formed along a longitudinal direction of the magnetic tape. As a method of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear-tapeopen (LTO) specification (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of a servo signal continuous in the longitudinal direction of the magnetic tape. A plurality of servo bands are normally provided on the magnetic tape. For example, the number thereof is 5 in the LTO tape. A region interposed between two adjacent servo bands is called a data band. The data band is configured of a plurality of data tracks and each data track corresponds to each servo track.

In one embodiment, as shown in JP2004-318983A, information showing the number of servo bands (also referred to as "servo band identification (ID)" or "Unique Data Band Identification Method (UDIM) information") is embedded in each servo band. This servo band ID is recorded by shifting a specific servo stripe among the plurality of pair of servo stripes in the servo band so that the position thereof is relatively displaced in the longitudinal direction of the magnetic tape. Specifically, the position of the shifted specific servo stripe among the plurality of pair of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, the group of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes are shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head includes pairs of gaps corresponding to the pairs of magnetic stripes by the number of servo bands. In general, a core and a coil are respectively connected to each of the pairs of gaps, and a magnetic field generated in the core can generate a leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo patterns to be formed. The width of each gap can be set as, for example, equal to or smaller than 1 μm, 1 to 10 μm, or equal to or greater than 10 μm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowing decreasing an intensity of the magnetic field, while reversing a direction of the magnetic field applied to the magnetic tape. Meanwhile, the DC erasing is performed by adding the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing becomes opposite to each other. Accordingly, the output of the servo signal obtained by the reading of the servo pattern can be increased. As disclosed in JP2012-053940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

The magnetic tape is normally accommodated in a magnetic tape cartridge and the magnetic tape cartridge is mounted on a magnetic recording and reproducing device.

Magnetic Tape Cartridge

One aspect of the invention relates to a magnetic tape cartridge including the tape-shaped magnetic recording medium (that is, magnetic tape).

The details of the magnetic tape included in the magnetic tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic recording and reproducing device in order to record and/or reproduce data on the magnetic tape, the magnetic tape is drawn from the magnetic tape cartridge and wound around the reel on the magnetic recording and reproducing device side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the magnetic recording and reproducing device side. In the meantime, the magnetic head comes into contact with and slides on the surface of the magnetic layer of the magnetic tape, and accordingly, the recording and/or reproduction of data is performed. With respect to this, in the twin reel type magnetic tape cartridge, both reels of the supply reel and the winding reel are provided in the magnetic tape cartridge. The magnetic tape cartridge may be any of single reel type magnetic tape cartridge and twin reel type magnetic tape cartridge. The magnetic tape cartridge may include the magnetic tape according to the embodiment of the invention, and well-known technologies can be applied for the other configurations.

Magnetic Recording and Reproducing Device

According to still another aspect of the invention, there is provided a magnetic recording and reproducing device comprising the magnetic recording medium.

In the invention and the specification, the "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be a sliding type magnetic recording and reproducing device. The sliding type magnetic recording and reproducing device is a device in which the surface of the magnetic layer and the magnetic head are in contact with each other and slide, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic tape, and can also be a reproducing head capable of performing the reproducing of data recorded on the magnetic tape. In addition, in the embodiment, the magnetic recording and reproducing device can include both of a recording head and a reproducing head as separate magnetic heads. In another embodiment, the magnetic head included in the magnetic recording and reproducing device can also have a configuration of comprising both of an element for recording data (recording element) and an element for reproducing data (reproducing element) in one magnetic head. Hereinafter, the element for recording data and the element for reproducing the data are collectively referred to as "elements for data". As the reproducing head, a magnetic head (MR head) including a magnetoresistive (MR) element capable of reading data recorded on the magnetic tape with excellent sensitivity as the reproducing element is preferable. As the MR head, various well-known MR heads such as an anisotropic magnetoresistive (AMR) head, a giant magnetoresistive (GMR) head, or a tunnel magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic recording and reproducing device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands at the same time. One or a plurality of elements for data can be disposed between the two servo signal reading elements.

In the magnetic recording and reproducing device, the recording of data on the magnetic recording medium and/or the reproducing of data recorded on the magnetic recording medium can be performed by bringing the surface of the magnetic layer of the magnetic recording medium into contact with the magnetic head and sliding. The magnetic recording and reproducing device may include the magnetic recording medium according to the embodiment of the invention, and well-known technologies can be applied for the other configurations.

For example, in a case of recording data and/or reproducing the recorded data, first, tracking using a servo signal is performed. That is, as the servo signal reading element follows a predetermined servo track, the element for data is controlled to pass on the target data track. The movement of the data track is performed by changing the servo track to be read by the servo signal reading element in the tape width direction.

In addition, the recording and reproducing head can also perform the recording and/or reproducing with respect to other data bands. In this case, the servo signal reading element is moved to a predetermined servo band by using the UDIM information described above, and the tracking with respect to the servo band may be started.

EXAMPLES

Hereinafter, the invention will be described in more detail with reference to examples. However, the invention is not limited to embodiments shown in the examples. Unless otherwise noted, "parts" and "%" described below indicate "parts by mass" and "% by mass". Unless otherwise noted, the following steps and evaluations were performed in the atmosphere at 23° C.±1° C. "eq" described below indicates equivalent and is a unit not convertible into SI unit.

In Table 1 below, "SrFe" indicates a hexagonal strontium ferrite powder produced by the method described below, and "ε-iron oxide" indicates an ε-iron oxide powder produced by the method described below. "BaFe" indicates a hexagonal barium ferrite powder having an average particle volume of 1,900 $nm^3$.

The average particle volume of the various ferromagnetic powders described below is a value obtained by the method described above. The various values related to the particle size of the various powders described below are also values obtained by the method described above.

The anisotropy constant Ku is a value obtained by the method described above regarding each ferromagnetic powder by using a vibrating sample magnetometer (manufactured by Toei Industry Co., Ltd.).

The mass magnetization σs is a value measured using a vibrating sample magnetometer (manufactured by Toei Industry Co., Ltd.) at a magnetic field strength of 15 kOe.

The anisotropic magnetic field Hk of the magnetic recording medium described below is a value measured using a vibrating sample magnetometer TM-VSM5050-SMS (manufactured by Tamagawa Seisakusho Co., Ltd.).

Method for Producing Ferromagnetic Powder
Method for Producing Hexagonal Strontium Ferrite Powder 1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a dissolving temperature of 1390° C., and a tap hole provided on the bottom of the platinum crucible was heated while stirring the dissolved liquid, and the dissolved liquid was tapped in a rod shape at approximately 6 g/sec. The tap liquid was rolled and cooled with a water cooling twin roller to prepare an amorphous body.

280 g of the produced amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder (in Table 1, "SrFe") obtained as described above, an average particle volume was 900 $nm^3$, an anisotropy constant Ku was $2.2 \times 10^5$ $J/m^3$, and a mass magnetization σs was 49 $A \cdot m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degree Method for Producing ε-Iron Oxide Powder 4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an ambient temperature of 25° C., and the mixture was stirred for 2 hours still under the temperature condition of the ambient temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1000° C. was filled with the obtained precursor of ferromagnetic powder in the atmosphere and subjected to heat treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicic acid compound which was an impurity was removed from the thermal-treated precursor of ferromagnetic powder.

After that, by the centrifugal separation process, ferromagnetic powder obtained by removing the silicic acid compound was collected and washed with pure water, and ferromagnetic powder was obtained.

The composition of the obtained ferromagnetic powder was confirmed by Inductively coupled plasma-optical emission spectrometry (ICP-OES), and Ga, Co, and Ti substitution type ε-iron oxide (ε-$Ga_{0.28}Co_{0.05}Ti_{0.05}Fe_{1.62}O_3$) was obtained. In addition, the X-ray diffraction analysis was performed under the same conditions as disclosed regarding the method for producing the hexagonal strontium ferrite powder described above, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (ε-iron oxide powder (in Table 1, "ε-iron oxide"), an average particle volume was 750 $nm^3$, an anisotropy constant Ku was $1.2\times10^5$ $J/m^3$, and a mass magnetization σs was 16 $A\cdot m^2/kg$.

Comparative Examples 1 to 3

A list of each layer forming composition is shown below.
List of Magnetic Layer Forming Composition
Ferromagnetic powder (See Table 1): 100.0 parts
Polyurethane resin 17.0 parts
Branched side chain-containing polyester polyol/diphenylmethane diisocyanate-$SO_3$Na=400 eq/ton
 α-$Al_2O_3$(Average particle size: 150 nm): 5.0 parts
 Diamond powder (average particle size: 60 nm): 1.0 part
 Carbon black (average particle size: 20 nm): 1.0 part
 Cyclohexanone: 110.0 parts
 Methyl ethyl ketone: 100.0 parts
 Toluene: 100.0 parts
 Butyl stearate: 2.0 parts
 Stearic acid: 1.0 part
 List of Non-Magnetic Layer Forming Composition
 Non-magnetic inorganic powder: α-iron oxide: 100.0 parts
 Average particle size (average long axis length): see Table 1
 Average short axis length: see Table 1
 Acicular ratio: see Table 1
 Carbon black (average particle size: 20 nm): 25.0 parts
 $SO_3$Na group-containing polyurethane resin: 18.0 parts
 Weight-average molecular weight: 70,000, $SO_3$Na group: 0.2 meq/g
 Stearic acid: 1.0 part
 Cyclohexanone: 300.0 parts
 Methyl ethyl ketone: 300.0 parts
 List of Back Coating Layer Forming Composition
 Non-magnetic inorganic powder (α-iron oxide) 85.0 parts
 Surface treatment layer: $Al_2O_3$, $SiO_2$
 Average particle size: 150 nm
 Tap density: 0.8
 acicular ratio: 7
 (Brunauer-Emmett-Teller (BET) specific surface area: 52 $m^2/g$
 pH: 8
 DBP (Dibutyl phthalate) oil absorption: 33 g/100 g
 Carbon black (average particle size: 16 nm): 20.0 parts
 Vinyl chloride copolymer (MR104 manufactured by Kaneka Corporation): 13.0 parts
 Polyurethane resin (Byron UR820 manufactured by Toyobo Co., Ltd.): 6.0 parts
 Phenylphosphonic acid: 3.0 parts
 Alumina powder (average particle size: 0.25 μm): 5.0 parts
 Cyclohexanone: 140.0 parts
 Methyl ethyl ketone: 170.0 parts
 Butyl stearate: 2.0 parts
 Stearic acid: 1.0 part
 Preparation of Each Layer Forming Composition Each component of each of the magnetic layer forming composition, the non-magnetic layer forming composition, and the back coating layer forming composition was kneaded with an open kneader for 240 minutes and then dispersed with a sand mill. The dispersion time was 720 minutes for the magnetic layer forming composition, 24 hours for the non-magnetic layer forming composition, and 1,080 minutes for the back coating layer forming composition. Zirconia beads having a beads diameter of 0.1 mm were used as the dispersion beads for dispersing the non-magnetic layer forming composition. The dispersion condition of the non-magnetic layer forming composition is referred to as a "dispersion condition 1". 4.0 parts of each of polyisocyanate (Coronate 3041 manufactured by Tosoh Corporation) was added to the dispersion liquid obtained as described above, and the mixture was further stirred and mixed for 20 minutes, and then filtered using a filter having a hole diameter of 0.5 μm.

Based on the above, the magnetic layer forming composition, a non-magnetic layer forming composition, and a back coating layer forming composition were prepared.

Production of Magnetic Tape Cartridge

The non-magnetic layer forming composition and the magnetic layer forming composition were simultaneously coated on one surface of a support made of biaxially stretched polyethylene naphthalate having a thickness of 4.6 μm. The coating amount of each composition is such that the non-magnetic layer forming composition has a thickness of the non-magnetic layer of 1.0 μm after drying, and the magnetic layer forming composition has a thickness of the magnetic layer of 60 nm after drying. A homeotropic alignment process was performed by applying a magnetic field having a magnetic field strength of 0.6 T in a vertical direction with respect to a surface of a coating layer, while the coating layer of the magnetic layer forming composition formed by applying as described above is wet. Then, the coating layer was dried in an environment having an ambient temperature of 100° C. to form a non-magnetic layer and a magnetic layer on one surface side of the support. The back coating layer forming composition was applied to the surface of the support on a side opposite to the surface where the non-magnetic layer and the magnetic layer were formed, so that the thickness after the drying is 0.4 μm, and was dried in the environment of the ambient temperature of 120° C. to form a back coating layer.

After that, the calendar process was performed at a calendar speed of 120 m/min, a linear pressure of 350 kg/cm (1 kg/cm is 0.98 kN/m) by a 7-stage calendar device composed of only one metal roll at calendar temperature (surface temperature of calendar roll) of 70° C. This calendar condition is referred to as "calendar condition 1". Then, after performing heat treatment for 24 hours in an environment of an ambient temperature of 70° C., a slit was made to a width of ½ inches (1 inch is 0.0254 meters). In a state where the magnetic layer of the magnetic tape obtained by slitting was demagnetized, servo patterns having disposition and shapes according to the LTO Ultrium format were formed on the magnetic layer by using a servo write head mounted on a commercially available servo writer. Accordingly, a magnetic tape including data bands, servo bands, and guide bands in the disposition according to the LTO Ultrium format in the magnetic layer, and including servo patterns (timing-based servo pattern) having the disposition and the shape according to the LTO Ultrium format on the servo band was obtained. The obtained magnetic tape was wound around a reel of a magnetic tape cartridge (LTO Ultrium7 data cartridge), and each magnetic tape cartridge of Comparative Examples 1 to 3 of a single reel type in which a magnetic tape having a length of 950 m was wound around the reel was produced.

Example 1

A magnetic tape cartridge was produced in the same manner as in Comparative Example 2, except that 1.0 part of palmitic acid was added to the non-magnetic layer forming composition as a dispersing agent and the dispersion conditions of the non-magnetic layer forming composition were changed from dispersion condition 1 to dispersion condition 2 (dispersion beads: zirconia beads having a beads diameter of 0.05 mm, dispersion time of 36 times).

Example 2

A magnetic tape cartridge was produced in the same manner as in Comparative Example 3, except that 1.0 part of palmitic acid was added to the non-magnetic layer forming composition as a dispersing agent and the dispersion conditions of the non-magnetic layer forming composition were changed from dispersion condition 1 to dispersion condition 2 (dispersion beads: zirconia beads having a beads diameter of 0.05 mm, dispersion time of 36 times).

Comparative Example 4

A magnetic tape cartridge was produced in the same manner as in Example 1, except that a dispersing agent (palmitic acid) was not added to the a non-magnetic layer forming composition.

Comparative Example 5

A magnetic tape cartridge was produced in the same manner as in Example 2, except that a dispersing agent (palmitic acid) was not added to the non-magnetic layer forming composition.

Example 3

A magnetic tape cartridge was produced in the same manner as in Comparative Example 2, except that the dispersion conditions of the non-magnetic layer forming composition were changed from dispersion condition 1 to dispersion condition 2 (dispersion beads: zirconia beads having a beads diameter of 0.05 mm, dispersion time of 36 times), and the coating amount of the non-magnetic layer forming composition was changed to form a non-magnetic layer having a thickness of 0.5 µm.

Example 4

A magnetic tape cartridge was produced in the same manner as in Comparative Example 3, except that the dispersion conditions of the non-magnetic layer forming composition were changed from dispersion condition 1 to dispersion condition 2 (dispersion beads: zirconia beads having a beads diameter of 0.05 mm, dispersion time of 36 times), and the coating amount of the non-magnetic layer forming composition was changed to form a non-magnetic layer having a thickness of 0.5 µm.

Example 5

A magnetic tape cartridge was produced in the same manner as in Comparative Example 2, except that the dispersion conditions of the non-magnetic layer forming composition were changed from dispersion condition 1 to dispersion condition 2 (dispersion beads: zirconia beads having a beads diameter of 0.05 mm, dispersion time of 36 times), and the non-magnetic layer forming composition and the magnetic layer forming composition were sequentially applied as below to form a non-magnetic layer and a magnetic layer.

The non-magnetic layer forming composition was applied to one surface of a support made of biaxial stretching polyethylene naphthalate having a thickness of 4.6 µm so that the thickness after drying is 1.0 µm, and dried in the environment of the ambient temperature of 100° C. to form a non-magnetic layer, and the magnetic layer forming composition was applied to the surface of the non-magnetic layer so that the thickness after drying is 60 nm, thereby forming a coating layer of the magnetic layer forming composition. A homeotropic alignment process was performed by applying a magnetic field having a magnetic field strength of 0.6 T in a vertical direction with respect to a surface of a coating layer, while the coating layer is wet. After that, the coating layer was dried to form a magnetic layer. Subsequent steps were the same as in Comparative Example 2.

Example 6

A magnetic tape cartridge was produced in the same manner as in Comparative Example 3, except that the dispersion conditions of the non-magnetic layer forming composition were changed from dispersion condition 1 to dispersion condition 2 (dispersion beads: zirconia beads having a beads diameter of 0.05 mm, dispersion time of 36 times), and the non-magnetic layer forming composition and the magnetic layer forming composition were sequentially applied in the same manner as in Example 5 to form a non-magnetic layer and a magnetic layer.

Example 7

A magnetic tape cartridge was produced in the same manner as in Comparative Example 2, except that two non-magnetic layers were formed as below, and the magnetic layer forming composition were sequentially applied onto the formed upper non-magnetic layer, as in the same manner as in Example 5, to form the magnetic layer.

List of Lower Non-Magnetic Layer Forming Composition
Carbon black (average particle size: 20 nm): 100.0 parts
Trioctylamine: 4.0 parts
Vinyl chloride resin: 12.0 parts
Stearic acid: 1.5 part
Stearic acid amide: 0.3 parts
Butyl stearate: 1.5 parts
Cyclohexanone: 200.0 parts
Methyl ethyl ketone: 510.0 parts
List of Upper Non-Magnetic Layer Forming Composition Non-magnetic inorganic powder: α-iron oxide: 100.0 parts Average particle size (average long axis length): see Table 1

Average short axis length: see Table 1

Acicular ratio: see Table 1

SO$_3$Na group-containing polyurethane resin: 18.0 parts

Weight-average molecular weight: 70,000, SO$_3$Na group: 0.2 meq/g

Stearic acid: 1.0 part

Cyclohexanone: 300.0 parts

Methyl ethyl ketone: 300.0 parts

Each component of each of the lower non-magnetic layer forming composition and the upper non-magnetic layer forming composition was kneaded with an open kneader for 240 minutes and then dispersed with a sand mill. As the dispersion condition of each non-magnetic layer forming composition, the dispersion condition 1 was used. 4.0 parts of each of polyisocyanate (Coronate 3041 manufactured by Tosoh Corporation) was added to the dispersion liquid obtained as described above, and the mixture was further stirred and mixed for 20 minutes, and then filtered using a filter having a hole diameter of 0.5 μm.

Based on the above, the lower non-magnetic layer forming composition and the upper non-magnetic layer forming composition were prepared.

The lower non-magnetic layer forming composition was applied to a surface of a biaxial stretching support made of polyethylene naphthalate having a thickness of 4.6 μm so that the thickness after the drying becomes 0.25 μm and was dried in the environment of the ambient temperature of 100° C. to form a lower non-magnetic layer. An upper non-magnetic layer forming composition was applied onto the lower non-magnetic layer so that the thickness after drying was 0.25 μm, and dried in an environment having an ambient temperature of 100° C. to form an upper non-magnetic layer.

Example 8

A magnetic tape cartridge was produced in the same manner as in Comparative Example 3, except that two non-magnetic layers were formed in the same manner as in Example 7, and the magnetic layer forming composition were sequentially applied onto the formed upper non-magnetic layer, in the same manner as in Example 5, to form the magnetic layer.

Example 9

A magnetic tape cartridge was produced in the same manner as in Example 7, except that α-iron oxide having a size shown in Table 1 was used as the α-iron oxide powder used for producing the upper non-magnetic layer forming composition.

Example 10

A magnetic tape cartridge was produced in the same manner as in Example 8, except that α-iron oxide having a size shown in Table 1 was used as the α-iron oxide powder used for producing the upper non-magnetic layer forming composition.

Example 11

A magnetic tape cartridge was produced in the same manner as in Example 9, except that 1.0 part of palmitic acid was added to the upper non-magnetic layer forming composition as a dispersing agent, and the calendar conditions were changed from calendar condition 1 to calendar condition 2 (calendar speed: 100 m/min, linear pressure 350 kg/cm, calendar temperature: 100° C.).

Example 12

A magnetic tape cartridge was produced in the same manner as in Example 10, except that 1.0 part of palmitic acid was added as a dispersing agent to the upper non-magnetic layer forming composition and the calendar condition was changed from calendar condition 1 to calendar condition 2.

Comparative Example 6

A magnetic tape cartridge was produced in the same manner as in Example 9, except that the lower non-magnetic layer, the upper non-magnetic layer, and the magnetic layer were formed as described below. That is, the upper non-magnetic layer forming composition and the magnetic layer forming composition were simultaneously applied in multiple layers.

The lower non-magnetic layer forming composition was applied to a surface of a biaxial stretching support made of polyethylene naphthalate having a thickness of 4.6 μm so that the thickness after the drying becomes 0.25 μm and was dried in the environment of the ambient temperature of 100° C. to form a lower non-magnetic layer. After that, the upper non-magnetic layer forming composition and the magnetic layer forming composition were simultaneously applied in multiple layers. The coating amount of each composition is such that the upper non-magnetic layer forming composition has thickness is 0.25 μm after drying, and the magnetic layer forming composition has a thickness of the magnetic layer of 60 nm after drying. A homeotropic alignment process was performed by applying a magnetic field having a magnetic field strength of 0.6 T in a vertical direction with respect to a surface of a coating layer, while the coating layer of the magnetic layer forming composition formed by applying as described above is wet. Then, the coating layer was dried in an environment having an ambient temperature of 100° C. to form a lower non-magnetic layer, an upper non-magnetic layer, and a magnetic layer on one surface side of the support.

Comparative Example 7

A magnetic tape cartridge was produced in the same manner as in Example 10, except that the lower non-magnetic layer, the upper non-magnetic layer, and the magnetic layer were formed in the same manner as in Comparative Example 6. That is, the upper non-magnetic layer forming composition and the magnetic layer forming composition were simultaneously applied in multiple layers.

Comparative Example 8

A magnetic tape cartridge was produced in the same manner as in Example 9, except that the calendar conditions were changed from calendar condition 1 to calendar condition 3 (calendar speed: 80 m/min, linear pressure 350 kg/cm, calendar temperature: 120° C.).

Comparative Example 9

A magnetic tape cartridge was produced in the same manner as in Example 10, except that the calendar condition was changed from the calendar condition 1 to the calendar condition 3.

Example 13

A magnetic tape cartridge was produced in the same manner as in Example 9, except that the composition prepared as the upper non-magnetic layer forming composition in Example 9 was applied to one surface of a biaxial stretching support made of polyethylene naphthalate having a thickness of 4.6 μm, as the non-magnetic layer forming composition, so that the thickness after the drying becomes 0.5 μm and was dried in the environment of the ambient temperature of 100° C. to form a single non-magnetic layer.

Example 14

A magnetic tape cartridge was produced in the same manner as in Example 9, except that the composition prepared as the upper non-magnetic layer forming composition in Example 10 was applied to one surface of a biaxial stretching support made of polyethylene naphthalate having a thickness of 4.6 μm, as the non-magnetic layer forming composition, so that the thickness after the drying becomes 0.5 μm and was dried in the environment of the ambient temperature of 100° C. to form a single non-magnetic layer.

For each of the examples and the comparative examples, two magnetic tape cartridges were produced, one was used for evaluation of physical properties, and the other one was used for evaluation of electromagnetic conversion characteristics.

The thickness of the non-magnetic layer shown in Table 1 is a designed thickness calculated from the manufacturing conditions, and is a total thickness of two non-magnetic layers for the magnetic tape including the two non-magnetic layers.

Evaluation Method of Physical Properties

Standard Deviation of Height of Magnetic Projection Portion

For the magnetic tape taken out from the magnetic tape cartridge, the standard deviation of the height of the magnetic projection portion was obtained by the following method.

(1) A region having an area of 6.0 μm×6.0 μm of the surface of the magnetic layer of the magnetic tape to be measured in the tapping mode is captured to obtain an AFM image, by using S-image/Nanonavi manufactured by Seiko Instruments Inc. as an atomic force microscope (AFM) and using SI-DF40 (back Al coat) manufactured by Hitachi High-Tech Science as a probe. In imaging conditions, a scan speed (probe movement speed) is set as 4.5 μm/sec and a resolution is set as 1024 px×1024 px.

(2) By using a scanning electron microscope (FE-SEM), the backscattered electron image of the region where the AFM image was obtained in (1) above is imaged. As imaging conditions, an acceleration voltage is set as 2 kV, a working distance is set as 3 mm, and an imaging magnification ratio is set as 20,000 times. Focus adjustment is performed under the imaging conditions described above, and a backscattered electron image is captured. The backscattered electron image in which the part displaying the size and the like (scale bar, cross mark, and the like) is removed from the captured image is incorporated into the image processing software (ImageJ of free software), and the binarization process was performed as below by the following procedure.

A threshold value for binarizing the backscattered electron image has a lower limit value of 210 gradations and an upper limit value of 255 gradations, and the binarization process is executed with these two threshold values. After the binarization process, in the image analysis software (ImageJ of free software), the blur process Gauss Filter is selected to remove the noise component.

For the binarized image obtained as described above, the position of bright area (that is, non-magnetic projection portion) is specified by image analysis software (ImageJ of free software).

In addition, in addition to the binarization process, a threshold value for binarizing the backscattered electron image has a lower limit value of 0 gradations and an upper limit value of 75 gradations, and the binarization process is executed with these two threshold values. After the binarization process, in the image analysis software (ImageJ of free software), the blur process Gauss Filter is selected to remove the noise component.

For the binarized image obtained as described above, the position of dark area (that is, non-magnetic projection portion) is specified by image analysis software (ImageJ of free software).

(3) From height data of the AFM image obtained in the above section (1), height data of the projection portion at the position specified as the non-magnetic projection portion in the SEM image in the above section (2) is excluded. The projection portion in the height data of the remaining projection portion is defined as a "magnetic projection portion". A standard deviation of the height of these magnetic projection portions (that is, the positive square root of the dispersion) is defined as a "standard deviation of the height of the magnetic projection portion".

The measurement and the analysis described above are performed for three different measurement regions on the surface of the magnetic layer (n=3). An arithmetic mean of the standard deviation of the height of the magnetic projection portion thus obtained is used as a value of the standard deviation of the height of the magnetic projection portion on the surface of the magnetic layer of the magnetic recording medium to be measured.

Surface Electric Resistance Value Rs

For each of the magnetic tapes of the examples and the comparative examples, a surface electrical resistance value Rs of the surface of the magnetic layer in a case where a voltage of 50 V was applied was measured by using an International Electrotechnical Commission (IEC) type Rs measuring holding device and by using a ½ inch (0.0127 m) wide digital super-insulated resistance measuring machine (TR-811A manufactured by Takeda Riken Co., Ltd.). Table 1 shows that, in a case where the measured value was less than $1.0 \times 10^{+7}$ Ω/sq, an evaluation result was "A", and in a case where the measured value was $1.0 \times 10^{+7}$ Ω/sq or more, the evaluation result was "B". The evaluation result A is preferable from a viewpoint of preventing foreign materials such as dust, which may cause dropout, from being attached to the surface of the magnetic layer due to charging. The Rs of the magnetic tapes whose evaluation result was A were $1.0 \times 10^{+4}$ Ω/sq or more and less than $1.0 \times 10^{+7}$ SI/sq.

Evaluation of Electromagnetic Conversion Characteristics

Each of the magnetic tape cartridges of the examples and the comparative examples was mounted to a magnetic recording and reproducing device, the magnetic tape was caused to run under the following running conditions, and a magnetic signal was recorded in the longitudinal direction of the magnetic tape under the following recording and reproducing conditions and was reproduced by a reproducing head (MR head). The reproduced signal was frequency-analyzed using a spectrum analyzer manufactured by Shibasoku Co., Ltd., and a ratio of the output of 300 kfci to the noise integrated in a range of 0 kfci to 600 kfci was defined as signal-to-noise-ratio (SNR). In addition, the unit kfci is a unit of linear recording density (cannot be converted to SI unit system). In a case of obtaining the SNR, a sufficiently stabilized signal was used after the running of the magnetic tape was started. Table 1 shows SNR as a relative value by setting the value of Comparative Example 1 as zero. In Comparative Example 8 and Comparative Example 9, the coefficient of friction during sliding between the surface of the magnetic layer and the reproducing head was too high to measure the SNR, and therefore, Table 1 describes it as "not measurable".

—Running Conditions—

Transportation speed (head/tape relative speed): 5.5 m/sec

Length per pass: 1,000 m

Number of times of running: 1,000 pass reciprocating

—Recording and Reproducing Conditions—

(Recording)

Recording track width: 5.0 μm

Recording gap: 0.17 μm

Saturated magnetic flux density (Bs) of magnetic head: 1.8 T (Reproducing)

Reproducing track width: 0.4 μm

Distance between shields: 0.08 μm

Linear recording density: 300 kfci

The above results are shown in Table 1.

TABLE 1

| | Ferromagnetic powder Kind | Number of non-magnetic layer | Lower non-magnetic layer Non-magnetic powder | Upper non-magnetic layer Non-magnetic powder | α-iron oxide of non-magnetic layer Average long axis length (nm) | α-iron oxide of non-magnetic layer Average short axis length (nm) | Acicular ratio | Non-magnetic layer Addition of Palmitic acid | Dispersion condition |
|---|---|---|---|---|---|---|---|---|---|
| Comparative Example 1 | BaFe | 1 | Carbon black/α-iron oxide | — | 10 | 9 | 1.1 | None | Dispersion condition 1 |
| Comparative Example 2 | SrFe | 1 | Carbon black/α-iron oxide | — | 10 | 9 | 1.1 | None | Dispersion condition 1 |
| Comparative Example 3 | ε-iron oxide | 1 | Carbon black/α-iron oxide | — | 10 | 9 | 1.1 | None | Dispersion condition 1 |
| Comparative Example 4 | SrFe | 1 | Carbon black/α-iron oxide | — | 10 | 9 | 1.1 | None | Dispersion condition 2 |
| Comparative Example 5 | ε-iron oxide | 1 | Carbon black/α-iron oxide | — | 10 | 9 | 1.1 | None | Dispersion condition 2 |
| Comparative Example 6 | SrFe | 2 | Carbon black | α-iron oxide | 10 | 9 | 1.1 | None | Dispersion condition 1 |
| Comparative Example 7 | ε-iron oxide | 2 | Carbon black | α-iron oxide | 10 | 9 | 1.1 | None | Dispersion condition 1 |
| Comparative Example 8 | SrFe | 2 | Carbon black | α-iron oxide | 10 | 9 | 1.1 | Added | Dispersion condition 1 |
| Comparative Example 9 | ε-iron oxide | 2 | Carbon black | α-iron oxide | 10 | 9 | 1.1 | Added | Dispersion condition 1 |
| Example 1 | SrFe | 1 | Carbon black/α-iron oxide | — | 10 | 9 | 1.1 | Added | Dispersion condition 2 |
| Example 2 | ε-iron oxide | 1 | Carbon black/α-iron oxide | — | 10 | 9 | 1.1 | Added | Dispersion condition 2 |
| Example 3 | SrFe | 1 | Carbon black/α-iron oxide | — | 10 | 9 | 1.1 | None | Dispersion condition 2 |
| Example 4 | ε-iron oxide | 1 | Carbon black/α-iron oxide | — | 10 | 9 | 1.1 | None | Dispersion condition 2 |
| Example 5 | SrFe | 1 | Carbon black/α-iron oxide | — | 10 | 9 | 1.1 | None | Dispersion condition 2 |
| Example 6 | ε-iron oxide | 1 | Carbon black/α-iron oxide | — | 10 | 9 | 1.1 | None | Dispersion condition 2 |
| Example 7 | SrFe | 2 | Carbon black | α-iron oxide | 30 | 15 | 2.0 | None | Dispersion condition 1 |
| Example 8 | ε-iron oxide | 2 | Carbon black | α-iron oxide | 30 | 15 | 2.0 | None | Dispersion condition 1 |
| Example 9 | SrFe | 2 | Carbon black | α-iron oxide | 10 | 9 | 1.1 | None | Dispersion condition 1 |
| Example 10 | ε-iron oxide | 2 | Carbon black | α-iron oxide | 10 | 9 | 1.1 | None | Dispersion condition 1 |
| Example 11 | SrFe | 2 | Carbon black | α-iron oxide | 10 | 9 | 1.1 | Added | Dispersion condition 1 |
| Example 12 | ε-iron oxide | 2 | Carbon black | α-iron oxide | 10 | 9 | 1.1 | Added | Dispersion condition 1 |
| Example 13 | SrFe | 1 | α-iron oxide | — | 10 | 9 | 1.1 | None | Dispersion condition 1 |
| Example 14 | ε-iron oxide | 1 | α-iron oxide | — | 10 | 9 | 1.1 | None | Dispersion condition 1 |

TABLE 1-continued

| | Non-magnetic layer Thickness | Coating method of magnetic layer forming composition and non-magnetic layer forming composition | Calendar process | Hk (kOe) | Standard deviation of height of magnetic projection portion (nm) | SNR (dB) | Surface electric resistance Evaluation result |
|---|---|---|---|---|---|---|---|
| Comparative Example 1 | 1.0 μm | Simultaneous multilayer coating | Calendar process 1 | 10 | 2.7 | 0.0 | A |
| Comparative Example 2 | 1.0 μm | Simultaneous multilayer coating | Calendar process 1 | 14 | 2.7 | −0.2 | A |
| Comparative Example 3 | 1.0 μm | Simultaneous multilayer coating | Calendar process 1 | 18 | 2.8 | −0.4 | A |
| Comparative Example 4 | 1.0 μm | Simultaneous multilayer coating | Calendar process 1 | 14 | 2.6 | −0.2 | A |
| Comparative Example 5 | 1.0 μm | Simultaneous multilayer coating | Calendar process 1 | 18 | 2.7 | −0.2 | A |
| Comparative Example 6 | 0.5 μm | Simultaneous multilayer coating | Calendar process 1 | 14 | 2.6 | 0.2 | A |
| Comparative Example 7 | 0.5 μm | Simultaneous multilayer coating | Calendar process 1 | 18 | 2.6 | 0.2 | A |
| Comparative Example 8 | 0.5 μm | Sequential coating | Calendar process 3 | 14 | 0.3 | Not measurable | A |
| Comparative Example 9 | 0.5 μm | Sequential coating | Calendar process 3 | 18 | 0.4 | Not measurable | A |
| Example 1 | 1.0 μm | Simultaneous multilayer coating | Calendar process 1 | 14 | 2.5 | 0.5 | A |
| Example 2 | 1.0 μm | Simultaneous multilayer coating | Calendar process 1 | 18 | 2.5 | 0.6 | A |
| Example 3 | 0.5 μm | Simultaneous multilayer coating | Calendar process 1 | 14 | 2.3 | 0.5 | A |
| Example 4 | 0.5 μm | Simultaneous multilayer coating | Calendar process 1 | 18 | 2.3 | 0.6 | A |
| Example 5 | 1.0 μm | Sequential coating | Calendar process 1 | 14 | 2.4 | 0.6 | A |
| Example 6 | 1.0 μm | Sequential coating | Calendar process 1 | 18 | 2.3 | 0.6 | A |
| Example 7 | 0.5 μm | Sequential coating | Calendar process 1 | 14 | 2.0 | 0.7 | A |
| Example 8 | 0.5 μm | Sequential coating | Calendar process 1 | 18 | 2.0 | 0.8 | A |
| Example 9 | 0.5 μm | Sequential coating | Calendar process 1 | 14 | 1.3 | 1.0 | A |
| Example 10 | 0.5 μm | Sequential coating | Calendar process 1 | 18 | 1.2 | 1.3 | A |
| Example 11 | 0.5 μm | Sequential coating | Calendar process 2 | 14 | 0.5 | 0.6 | A |
| Example 12 | 0.5 μm | Sequential coating | Calendar process 2 | 18 | 0.5 | 0.7 | A |
| Example 13 | 0.5 μm | Sequential coating | Calendar process 1 | 14 | 1.3 | 1.0 | B |
| Example 14 | 0.5 μm | Sequential coating | Calendar process 1 | 18 | 1.2 | 1.3 | B |

The magnetic tape cartridges of Comparative Examples 1 to 3 are magnetic tape cartridges produced in the same manner except that the types of ferromagnetic powders are different. From the evaluation results of the electromagnetic conversion characteristics (SNR) of Comparative Examples 1 to 3 shown in Table 1, it could be confirmed that the electromagnetic conversion characteristics are likely to deteriorate, in a case where a magnetic layer including hexagonal strontium ferrite powder or ε-iron oxide powder is provided.

Also in Examples 1 to 14, the magnetic tape includes a magnetic layer including hexagonal strontium ferrite powder or ε-iron oxide powder. As shown in Table 1, in Examples 1 to 14 in which the standard deviation of the height of the magnetic projection portion is in a range of 0.5 to 2.5 nm, a higher SNR value was obtained, compared to Comparative Examples 2 to 7 in which the standard deviation of the magnetic projection portion of the magnetic layer including hexagonal strontium ferrite powder or ε-iron oxide powder. From this result, it can be confirmed that, in the magnetic layer including the ferromagnetic powder selected from the group consisting of hexagonal strontium ferrite powder and ε-iron oxide powder, the standard deviation of the height of the magnetic projection portion in a range of 0.5 to 2.5 nm contributes to the improvement of the electromagnetic conversion characteristics.

In addition, from the comparison between Examples 1 to 12 and Examples 13 and 14, it can be confirmed that, it is preferable to provide the non-magnetic layer including carbon black, from viewpoints of contributing to a decrease in Rs on the surface of the magnetic layer and suppressing the charging.

One embodiment of the present invention is useful in the technical field of magnetic recording media for high density recording.

What is claimed is:

1. A magnetic recording medium comprising:
   a non-magnetic support; and
   a magnetic layer including a ferromagnetic powder,
   wherein the ferromagnetic powder is a ferromagnetic powder selected from the group consisting of a hexagonal strontium ferrite powder and an ε-iron oxide powder, and
   a standard deviation of a height of a magnetic projection portion on a surface of the magnetic layer is in a range of 0.5 to 2.5 nm, the standard deviation being a value obtained on the surface of the magnetic layer as follows:
   (1) imaging a region of a surface of the magnetic layer of the magnetic recording medium to be measured in a tapping mode by an atomic force microscope (AFM) to obtain an AFM image;
   (2) obtaining a scanning electron microscope (SEM) image in the same region where the AFM image was obtained, the SEM image being a backscattered electron image, and specifying a non-magnetic projection portion in the backscattered electron image;
   (3) excluding, from height data of the AFM image obtained in (1), height data of a projection portion at a position specified as the non-magnetic projection portion in the SEM image in (2), the projection portion in the height data of the remaining projection portion being defined as a magnetic projection portion,
   defining a standard deviation of the height of these magnetic projection portions as being the standard deviation of the height of the magnetic projection portion, and
   performing the above measurement and analysis for three different measurement regions on the surface of the magnetic layer, the arithmetic mean of the standard deviation of the height of the magnetic projection portion thus obtained being used as a value of the standard deviation of the height of the magnetic projection portion on the surface of the magnetic layer of the magnetic recording medium to be measured.

2. The magnetic recording medium according to claim 1, further comprising:
   at least one layer of a non-magnetic layer including a non-magnetic powder between the non-magnetic support and the magnetic layer.

3. The magnetic recording medium according to claim 2, wherein the non-magnetic powder is a non-magnetic powder selected from the group consisting of a non-magnetic iron oxide powder and a carbon black.

4. The magnetic recording medium according to claim 3, wherein the magnetic recording medium has at least one layer of a non-magnetic layer including a carbon black.

5. The magnetic recording medium according to claim 2, comprising two layers of the non-magnetic layer.

6. The magnetic recording medium according to claim 5, wherein, among the two non-magnetic layers, one non-magnetic layer on a magnetic layer side contains a non-magnetic iron oxide powder, and the other non-magnetic layer on a non-magnetic support side contains a carbon black.

7. The magnetic recording medium according to claim 3, wherein the non-magnetic iron oxide powder is an α-iron oxide powder.

8. The magnetic recording medium according to claim 3, wherein an average particle size of the non-magnetic iron oxide powder is 50 nm or less.

9. The magnetic recording medium according to claim 3, wherein an acicular ratio of the non-magnetic iron oxide powder is 3.0 or less.

10. The magnetic recording medium according to claim 1, wherein a surface electric resistance value Rs of the surface of the magnetic layer is less than $1.0 \times 10^{+7}$ Ω/sq.

11. The magnetic recording medium according to claim 2, wherein a thickness of the non-magnetic layer is in a range of 0.05 to 1.5 µm, and
    in a case where a plurality of the non-magnetic layers are provided, the thickness is a total thickness of the plurality of non-magnetic layers.

12. The magnetic recording medium according to claim 1, further comprising a back coating layer including a non-magnetic powder on a surface side of the non-magnetic support opposite to a surface side on which the magnetic layer is provided.

13. The magnetic recording medium according to claim 1, wherein the magnetic recording medium is a magnetic tape.

14. A magnetic tape cartridge comprising the magnetic tape according to claim 13.

15. A magnetic recording and reproducing device comprising the magnetic recording medium according to claim 1.

* * * * *